(12) United States Patent
Jenkner et al.

(10) Patent No.: US 8,039,110 B2
(45) Date of Patent: Oct. 18, 2011

(54) SPECIAL AMINOALKYLSILANE COMPOUNDS AS BINDERS FOR COMPOSITE MATERIALS

(75) Inventors: Peter Jenkner, Wesel (DE); Burkhard Standke, Loerrach (DE); Jaroslaw Monkiewicz, Rheinfelden (DE); Roland Edelmann, Rheinfelden (DE); Alireza Kharazipour, Goettingen (DE); Lars Kloeser, Goettingen (DE)

(73) Assignee: Evonik Degussa GmbH, Essen (DE)

( * ) Notice: Subject to any disclaimer, the term of this patent is extended or adjusted under 35 U.S.C. 154(b) by 781 days.

(21) Appl. No.: 11/995,215

(22) PCT Filed: Jun. 2, 2006

(86) PCT No.: PCT/EP2006/062874
§ 371 (c)(1),
(2), (4) Date: Jan. 10, 2008

(87) PCT Pub. No.: WO2007/023007
PCT Pub. Date: Mar. 1, 2007

(65) Prior Publication Data
US 2008/0233341 A1    Sep. 25, 2008

(30) Foreign Application Priority Data

Aug. 26, 2005 (DE) .......... 10 2005 040 682
Feb. 14, 2006 (DE) .......... 10 2006 006 654

(51) Int. Cl.
*B32B 3/12* (2006.01)
*B32B 5/24* (2006.01)
*B32B 5/16* (2006.01)

(52) U.S. Cl. ........ 428/425.1; 428/113; 428/311.71; 428/313.5; 428/326; 428/327

(58) Field of Classification Search .......... None
See application file for complete search history.

(56) References Cited

U.S. PATENT DOCUMENTS

| | | | |
|---|---|---|---|
| 5,629,400 A | 5/1997 | Standke et al. ............ 528/38 |
| 5,679,147 A | 10/1997 | Standke et al. ......... 106/287.11 |
| 5,808,125 A | 9/1998 | Standke et al. ............ 556/224 |
| 5,849,942 A | 12/1998 | Standke et al. ............ 556/424 |
| 5,863,509 A | 1/1999 | Standke et al. ............ 422/221 |
| 5,885,341 A | 3/1999 | Standke et al. ......... 106/287.11 |
| 6,054,601 A | 4/2000 | Standke et al. ............ 556/425 |
| 6,077,966 A * | 6/2000 | Matsumura et al. ......... 556/425 |
| 6,176,918 B1 | 1/2001 | Glausch et al. |
| 6,177,582 B1 | 1/2001 | Jenkner et al. ............ 556/425 |
| 6,228,936 B1 | 5/2001 | Standke et al. ............ 524/838 |
| 6,239,194 B1 | 5/2001 | Standke et al. ............ 523/200 |
| 6,251,989 B1 | 6/2001 | Edelmann et al. ........... 524/837 |
| 6,255,513 B1 | 7/2001 | Standke et al. ............ 556/425 |
| 6,288,256 B1 | 9/2001 | Standke et al. ............ 556/425 |
| 6,361,871 B1 | 3/2002 | Jenkner et al. ............ 428/447 |
| 6,395,858 B1 | 5/2002 | Mack et al. ............... 528/38 |
| 6,403,228 B1 | 6/2002 | Mack et al. ............... 428/447 |
| 6,491,838 B1 | 12/2002 | Standke et al. ............ 252/8.57 |
| 6,500,883 B1 | 12/2002 | Mack et al. ............... 523/213 |
| 6,534,667 B1 | 3/2003 | Standke et al. ............ 556/413 |
| 6,641,870 B2 | 11/2003 | Bartkowiak et al. ........ 427/407.1 |
| 6,685,766 B2 | 2/2004 | Standke et al. ............ 106/14.41 |
| 6,695,904 B2 | 2/2004 | Burger et al. ............ 106/287.14 |
| 6,713,186 B1 | 3/2004 | Jenkner et al. ............ 428/447 |
| 6,770,327 B2 | 8/2004 | Edelmann et al. ........... 427/387 |
| 6,841,197 B2 | 1/2005 | Standke et al. ............ 427/387 |
| 7,026,398 B2 | 4/2006 | Monkiewicz et al. ........ 525/100 |
| 7,427,442 B2 | 9/2008 | Albert et al. ............. 428/447 |
| 7,578,877 B2 | 8/2009 | Giessler et al. ........... 106/287.14 |
| 7,611,753 B2 | 11/2009 | Bartkowiak et al. ........ 427/393.6 |
| 7,666,257 B2 | 2/2010 | Giessler-Blank et al. . 106/287.4 |
| 7,670,422 B2 | 3/2010 | Giessler-Blank et al. . 106/287.4 |
| 2004/0113117 A1 | 6/2004 | Matsumura et al. ......... 252/8.62 |
| 2007/0054056 A1 | 3/2007 | Albert et al. ............. 427/387 |
| 2008/0027161 A1 | 1/2008 | Schlosser et al. ......... 524/188 |
| 2008/0058489 A1 | 3/2008 | Edelmann et al. |
| 2008/0187673 A1 | 8/2008 | Standke et al. ............ 427/421 |
| 2008/0188617 A1 | 8/2008 | Standke et al. ............ 524/837 |
| 2009/0069464 A1 | 3/2009 | Standke .................. 524/35 |

FOREIGN PATENT DOCUMENTS

| | | |
|---|---|---|
| DE | 199 39 866 | 3/2001 |
| DE | 100 37 724 | 2/2002 |
| EP | 0 613 905 A1 | 9/1994 |
| EP | 0 613 906 A1 | 9/1994 |
| JP | 2004 223778 | 8/2004 |

OTHER PUBLICATIONS

U.S. Appl. No. 11/572,555, filed Jan. 23, 2007, Just, et al.
U.S. Appl. No. 11/572,688, filed Jan. 25, 2007, Edelmann, et al.
U.S. Appl. No. 11/576,504, filed Apr. 2, 2007, Mueh, et al.
U.S. Appl. No. 11/995,751, filed Jan. 15, 2008, Edelmann, et al.
U.S. Appl. No. 11/995,550, filed Jan. 14, 2008, Edelmann, et al.
U.S. Appl. No. 12/673,390, filed Feb. 12, 2010, Wassmer, et al.
U.S. Appl. No. 12/674,271, filed Feb. 19, 2010, Albert, et al.
U.S. Appl. No. 12/161,112, filed Jul. 16, 2008, Standke, et al.
U.S. Appl. No. 12/678,299, filed Mar. 16, 2010, Borup, et al.

(Continued)

*Primary Examiner* — Angela Ortiz
*Assistant Examiner* — Camie Thompson
(74) *Attorney, Agent, or Firm* — Oblon, Spivak, McClelland, Maier & Neustadt, L.L.P.

(57) ABSTRACT

A composite material, useful in producing wood-based materials, comprises (a) at least one cellulose- or lignocellulose-containing material and (b) at least one aminoalkylsilane, or at least one cocondensate of the at least one aminoalkylsilane and at least one further functional silane, or an aqueous solution which contains the at least one aminoalkylsilane or the at least one cocondensate of the at least one aminoalkylsilane and the at least one further functional silane.

23 Claims, No Drawings

OTHER PUBLICATIONS

U.S. Appl. No. 12/159,785, filed Jul. 1, 2008, Standke, et al.

U.S. Appl. No. 12/181,629, filed Sep. 4, 2008, Militz, et al.

* cited by examiner

SPECIAL AMINOALKYLSILANE COMPOUNDS AS BINDERS FOR COMPOSITE MATERIALS

CROSS-REFERENCE TO RELATED APPLICATIONS

The present application is a 35 U.S.C. §371 National Stage patent application of International patent application PCT/EP06/062874, filed on Jun. 2, 2006, which claims priority to German patent applications DE 102006006654.5, filed on Feb. 14, 2006, and DE 102005040682.3, filed on Aug. 26, 2005.

The present invention relates to composite materials based on cellulose- or lignocellulose-containing materials and organosilicon compounds as binders, a process for the preparation thereof and the use of special organosilicon compounds or a solution thereof.

Organosilicon compounds are used in the form of various silanes, their reaction products or corresponding formulations in the production of composite materials, in particular those based on natural or near-natural fibers, i.e. cellulose- or lignocellulose-containing materials.

Wood-based materials comprise up to 20% of binder and other additives. The most frequently used binder worldwide for wood-based materials is urea-formaldehyde resin (UF resin).

However, formaldehyde resin-bound wood-based materials have a continuous formaldehyde emission which, in spite of compliance with guidelines (EN 120 and DIBt guideline 100, class E1=0.1 ppm), appears problematic from the point of view of consumer protection since many studies have shown that formaldehyde not only affects the central nervous system but can also cause carcinomas. Very recently, there have been increasing demands for further reduction in the permissible formaldehyde concentrations.

Furthermore, wood-based materials glued with UF resin have a comparatively low heat and moisture resistance, which excludes use for most special areas, for example for load-bearing and high-strength purposes and for the outdoor sector.

In addition to the UF resins, about 10% of phenol-formaldehyde resin (PF resin) is also used for the production of wood-based materials.

Organic isocyanates are used in a small proportion in the wood-based materials industry for materials having good mechanical and water-resistant properties. Diphenylmethane diisocyanate (PMDI) is mainly used. In contrast to the systems described above, the isocyanates form chemical compounds with the wood, demonstrably with lignin and cellulose.

However, the use of PMDI as a binder entails a large number of disadvantages. From the point of view of application technology, the affinity to metal is a cause for complaint since PMDI-glued chips and fibers can adhere to press belts during the hot-pressing. For this reason, it is necessary to work with expensive, specially coated press belts.

In addition, stringent work safety measures must be provided and complied with when handling PMDI.

Binders or binder systems for natural or near-natural wood-based materials, such as, for example, potato pulps (EP 0 613 906 A1, DE 43 06 441 A1, DE 43 40 517 A1, DE 434 518 A1), do not ensure an effect complying with standards for every application (in this context, cf. also "Enzyme von Weißfäulepilzen als Grundlage für die Herstellung von Bindemitteln für Holzwerkstoffe [Enzymes of white rot fungi as a basis for the preparation of binders for wood-based materials]" by A. R. Kharazipour, Vol. 121, J D. Sauerländers Verlag, Frankfurt am Main, ISBM 3-7939-5124-3).

DE 100 37 724 A1 discloses a process for the production of composite materials from organic substances using a binder based on hydrogen-, alkyl-, alkenyl-, phenyl-, glycidyloxyalkyl-, acryloyloxyalkyl- and methacryloyloxyalkyl-functional siloxanes.

DE 196 47 369 A1 relates to composite materials based on glass fibers, mineral fibers or wood-based materials, the binder used being a so-called nanocomposite which is prepared by the sol-gel process and is based, inter alia, on colloidal inorganic particles and one or more hydrolyzable organosilanes. The silanes used there can carry chloride, alkoxy, acetoxy, alkyl, alkenyl, aryl, glycidyloxyalkyl and methacryloxyalkyl groups as functional groups.

Furthermore, WO 98/22536 discloses composite materials based on plant materials, over and above the recommendation of DE 196 47 369 A1, alkynyl, alkaryl and arylalkylene groups which optionally may also have one or more substituents, such as halogen, alkoxy, hydroxyl, amino or epoxide groups, also being stated to the polysiloxane of the sol-gel system as possible radicals which cannot be eliminated hydrolytically, in addition to alkyl and alkenyl groups. Furthermore, according to WO 98/22536 pure methyltriethoxysilane or a mixture of methyltriethoxysilane and tetraalkoxysilane can be used as a binder for the production of a composite material.

A substantial disadvantage of the abovementioned systems is that hydrolyzable alkoxides are also used. These have a vapor pressure which is not negligible and moreover eliminate alcohol as a hydrolysis product. In practice, on the processing machine customary in particleboard works, this leads to a considerable odor and to a hazard due to explosive vapors.

EP 0 716 127 B1 and EP 0 716 128 B1 disclose water-based aminoalkyl-/alkyl-/hydroxyl- or alkoxysiloxane-containing compositions which are used, inter alia, for imparting hydrophobic properties to textiles, leather, cellulose products and starch products. Such aminoalkylorganohydroxysiloxanes soluble in water or water/alcohol mixture are also referred to as hydrosil systems. Fluoroalkyl-functional hydrosil systems are disclosed, for example, in EP 0 846 716 B1, EP 0 846 717 B1 and EP 1 101 787 A2.

The object of the present invention was to provide cellulose- or lignocellulose-containing composite materials which are based on a further binder.

The object is achieved, according to the invention, according to the statements of the patent claims.

Thus, it was surprisingly found that novel composite materials having substantially improved properties and based on (a) at least one cellulose- or lignocellulose-containing material and (b) as a binder, at least one aminoalkylsilane of the formula (I)

$$R^1R^2N(CHR^4)_aSi(R^3)_r(OR)_{3-r} \qquad (I),$$

in which groups $R^1$ and $R^2$ are identical or different and in each case are H or a linear, branched or cyclic $C_1$- to $C_{20}$-alkyl group or an aryl group or an aminocarbyl group of the form $H_2N—(C=O)—$ (resultant ureido group), $R^3$ is H or a linear or branched $C_1$- to $C_8$-alkyl group, groups $R^4$ are identical or different and $R^4$ is H or methyl, a is from 1 to 10, preferably 3, groups R are identical or different and R is H or a linear or branched $C_1$- to $C_8$-alkyl group and r is 0 or 1 or 2, it being possible for groups $R^1$ and $R^2$ to be optionally substituted and preferred substituents being halogens from the series F, Cl, Br and I or silyl groups of the form $—(CHR^{4'})_{a'}Si(R^{3'})_{r'}(OR')_{3-r'}$ or aminoalkyl groups of the form —(CHR⁴')ₐNR¹'R²', for example
—(CH₂)₃Si(OCH₃)₃,
—(CH₂)₃Si(OC₂H₅)₃,
—(CH₂)₃Si(CH₃)(OCH₃)₂,
—(CH₂)₃Si(CH₃)(OC₂H₅)₂,
—(CH₂)₂NH(CH₂)₃Si(OCH₃)₃,
—(CH₂)₂NH(CH₂)₃Si(OC₂H₅)₃,
—(CH₂)₂NH(CH₂)₃Si(CH₃)(OCH₃)₂,
—(CH₂)₂NH(CH₂)₃Si(CH₃)(OC₂H₅)₂,
—(CH₂)₂NH(CH₂)₂NH(CH₂)₃Si(OCH₃)₃,
—(CH₂)₂NH(CH₂)₂NH(CH₂)₃Si(OC₂H₅)₃,
—(CH₂)₂NH(CH₂)₂NH(CH₂)₃Si(CH₃)(OCH₃)₂,
—(CH₂)₂NH(CH₂)₂NH(CH₂)₃Si(CH₃)(OC₂H₅)₂,
and branched aminoalkyl-functional groups, such as

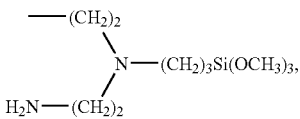

to mention but a few examples in each case,
a' is from 1 to 10 and r' is 0 or 1 or 2 and R', R¹', R²', R³', R⁴' have the same meaning as the corresponding groups R, R¹, R², R³ and R⁴ each already referred to above,
or
at least one cocondensate of at least one aminoalkylsilane of the general formula (I) and at least one further functional silane of the general formula (II)

$$R^7(CHR^6)_bSi(R^5)_p(OR)_{3-p} \qquad (II),$$

in which R⁷ is H or a vinyl group or an amino group or a glycidyloxy group or an acryloyloxy group or a methacryloyloxy group or a mercapto group or a sulfane group or a linear or branched C₁- to C₂₀-alkyl group or an aryl group, it being possible for the group R⁷ to be optionally substituted, groups R⁶ are identical or different and R⁶ is H or methyl, b is from 0 to 18, preferably 0, 1, 2, 3, 4, 8, 16 or 18, R⁵ is H or a linear or branched C₁- to C₈-alkyl group, groups R are identical or different and R is H or a linear or branched C₁- to C₈-alkyl group and p is 0 or 1 or 2,
it being possible for the amino functions in the cocondensate to be partly or completely neutralized with an inorganic or organic acid (also referred to below as HX or HₙX where n=1, 2 or 3), X preferably being F⁻, Cl⁻, Br⁻, I⁻, NO₃⁻, HSO₄⁻, SO₄²⁻, H₂PO₄⁻, HPO₄²⁻, PO₄³⁻, HCOO⁻ or CH₃COO⁻, or
an aqueous solution which contains at least one aminoalkylsilane of the formula (I) or at least one cocondensate based on at least one aminoalkylsilane of the general formula (I) and at least one further functional silane of the general formula (II), are obtainable in a simple and economical manner by
treating dried or moist cellulose- or lignocellulose-containing material with
a liquid or solution which contains at least one aminosilane compound according to the formula (I) or at least one cocondensate based on at least one aminoalkylsilane of the general formula (I) and at least one further functional silane of the general formula (II) and
bringing the cellulose or lignocellulose material thus treated into a desired form and then hot-pressing it.
Said cocondensates based on at least one aminoalkylsilane of the formula (I) and at least one further functional silane of the formula (II) can as a rule be understood as meaning those compounds as may be represented according to general chemical understanding by the general formula (III)

$$[(OH)_u(OR)_v(O)_wSi(R^3)_r(CHR^4)_aN(R^1)(R^2)]_x[(OH)_d(OR)_e(O)_fSi(R^5)_p(CHR^6)_bR^7]_y \qquad (III),$$

in which the groups R, R¹, R², R³, R⁴, R⁵, R⁶ and R⁷ and a and b correspond to the meaning according to that in the formulae (I) and (II) and u may be from 0 to 3, v may be from 0 to 3, w may be from 0 to 1.5, d may be from 0 to 3, e may be from 0 to 3, f may be from 0 to 1.5, x may be form 1 to 1000, y may be from 0 to 1000, r may be 0 or 1 or 2 and p may be 0 or 1 or 2, with the provisos that (u+v+2w)=(3−r) and (d+e+2f)=(3−p) and (x+y) is from 1 to 2000, preferably from 2 to 1000, particularly preferably from 3 to 500, very particularly preferably from 4 to 100, in particular (x+y) is from 5 to 50.

Thus, one or more different aminosilanes can be subjected to cocondensation with one or more different functional silanes. Furthermore, said cocondensates may also be block copolymers and those having a random distribution.

Moreover, binders used according to the invention can advantageously contain a further component, such as, for example, water repellents based on paraffin or wax, flameproofing agents, e.g. polyphosphates, and biocidal substances and fragrances—to mention but a few.

Aqueous binders which have been rendered acidic and contain at least one aminosilane compound according to the formula (I) or at least one condensate based on at least one aminoalkylsilane of the general formula (I) and at least one further functional silane of the general formula (II) can also be used with the result that a curing agent solution as a further additive can advantageously be dispensed with.

Composite materials according to the invention are advantageously distinguished as a rule by a substantially improved transverse tensile strength, flexural strength and considerably improved swelling behavior compared with many composite materials to date.

Moreover, compared with UF-, PF- or MF-glued composite materials, composite materials according to the invention emit no harmful formaldehyde vapors.

Furthermore, the production of composite materials glued according to the invention, in particular wood-based materials, is possible with a substantially reduced processing risk and dramatically reduced health-relevant risk, with constant or better properties of the products produced, in comparison with the PMDI-bound wood-based materials.

Particularly in the case of medium-density fiberboards (MDF) obtained according to the invention, material testing gives results which surpass the requirements of EN 622-5 with regard to transverse tensile strength by up to 147%. The swelling values of MDF glued according to the invention after storage in water for 24 hours fell below the specifications of said EN by more than 50%. Thus, MDF according to the invention can advantageously be assigned to a material class which far surpasses purely aminoplast-bound MDF with regard to the mechanical-technological properties.

The present invention therefore relates to composite materials based on (a) at least one cellulose- or lignocellulose-containing material and (b) at least one aminoalkylsilane of the formula (I)

$$R^1R^2N(CHR^4)_aSi(R^3)_r(OR)_{3-r} \qquad (I),$$

in which groups R¹ and R² are identical or different and in each case are H or a linear, branched or cyclic C₁- to C₂₀-alkyl group or an aryl group or an aminocarbyl group, it being possible for groups R¹ and R² to be optionally substituted, R³ is H or a linear or branched C₁- to C₈-alkyl group, groups R⁴ are identical or different and R⁴ is H or methyl, a is from 1 to 10, groups R are identical or different and R is H or a linear or branched C₁- to C₈-alkyl group and r is 0 or 1 or 2, or at least one cocondensate of at least one aminoalkylsilane of the general formula (I) and at least one further functional silane of the general formula (II)

in which $R^7$ is H or a vinyl group or an amino group or a glycidyloxy group or an acryloyloxy group or a methacryloyloxy group or a mercapto group or a sulfane group or a linear or branched $C_1$- to $C_{20}$-alkyl group or an aryl group, it being possible for the group $R^7$ to be optionally substituted, groups $R^6$ are identical or different and $R^6$ is H or methyl, b is from 0 to 18, $R^5$ is H or a linear or branched $C_1$- to $C_8$-alkyl group, groups R are identical or different and R is H or a linear or branched $C_1$- to $C_8$-alkyl group and p is 0 or 1 or 2, it being possible for the amino functions in the cocondensate to be partly or completely neutralized with an inorganic or organic acid, or an aqueous solution which contains at least one aminoalkylsilane of the formula (I) or at least one cocondensate based on at least one aminoalkylsilane of the general formula (I) and at least one further functional silane of the general formula (II), as a binder.

Composite materials according to the invention are preferably characterized by (a) at least one natural or near-natural cellulose- or lignocellulose-containing material from the series consisting of industrial wood, forestry industry wood, used or recycled wood, wood shavings, wood chips, wood fibers, wood wool, wood dust, sawdust, planing chips, cutting chips, shuttering boards, veneer waste, splinters, chip material from annual plants, e.g. hemp scrapings or cotton straw, or a mixture of at least two of the abovementioned materials.

Cellulose- or lignocellulose-containing fiber material advantageously originates from hardwood and softwood, palm fibers, e.g. coconut fibers, and annual plants, such as rice straw, cereal straw, cotton, jute, hemp—to list but a few.

Furthermore, a composite material according to the invention is distinguished by an aminoalkylsilane compound of the formula (I) or at least one cocondensate based on at least one aminoalkylsilane of the general formula (I) and at least one further functional silane of the general formula (II) according to component (b) as a binding active substance, the binding active substance preferably having at least one aminoalkyl group from the series consisting of 3-aminopropyl, 3-amino-2-methylpropyl, N-(2-aminoethyl)-3-aminopropyl, N-(2-aminoalkyl)-3-amino-2-methyl propyl, N—[N'-(2-aminoethyl)-2-aminoethyl]-3-aminopropyl, N—[N-(2-aminoethyl)-2-aminoethyl]-3-amino-2-methylpropyl, N,N-[di(2-aminoethyl)]-3-aminopropyl, N,N-[di(2-aminoethyl)]-3-amino-2-methylpropyl, N-(n-butyl)-3-aminopropyl, N-(n-butyl)-3-amino-2-methylpropyl, to mention but a few.

For a group according to $R^1R^2N(CHR^4)_a$— in the formula (I) or (III), groups from the series consisting of
$H_2N(CH_2)_3$—,
$H_2N(CH_2)_2NH(CH_2)_3$—,
$H_2N(CH_2)_2NH(CH_2)_2NH(CH_2)_3$— and

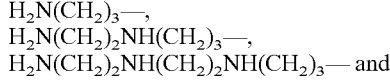

are particularly preferred.

Furthermore, a preferred group $R^7(CHR^6)_b$— according to formula (II) or (III) is the one from the series consisting of $CH_3$—, $(n)C_3H_7$—, (i) $C_3H_7$—, $(n)C_4H_9$—, (i) $C_4H_9$—, $(n)C_8H_{17}$—, (i) $C_8H_{17}$—, $(n)C_{16}H_{32}$—, (i) $C_{16}H_{32}$—, $(n)C_{18}H_{36}$—, (i) $C_{18}H_{36}$—, $H_2N(CH_2)_3$—, $H_2N(CH_2)_2NH(CH_2)_3$—, $H_2N(CH_2)NH(CH_2)_2NH(CH_2)_3$—, $[H_2N(CH_2)_2]_2N(CH_2)_3$—, $HS(CH_2)_3$—, $(H_3CO)_3Si(CH_2)_3$—$S_x$—$(CH_2)_3$— where x=from 1 to 10, preferably 2, 3, 4 or 5, $C_6H_5$—, $H_2C=C(CH_3)COO(CH_2)_3$— and

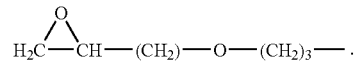

Such binding active substances used according to the invention for the present composite materials can, according to component (b), advantageously be an aqueous, substantially alcohol-free hydrolysis product of at least one aminoalkylsilane compound according to the formula (I) or at least one cocondensate based on at least one aminoalkylsilane of the general formula (I) and at least one further functional silane of the general formula (II).

Such an alcohol-free hydrolysis product may have a pH of from 1 to 14, preferably from 3 to 12, particularly preferably from 4 to 10, and a viscosity of from 1 to 10 000 mPa·s, preferably from 1 to 1000 mPa·s, with an active substance content of from 0.1 to 80% by weight, preferably from 1 to 80% by weight, particularly preferably from 10 to 60% by weight, based on the composition of the agent. The pH can be determined, for example, according to DIN 38404-5 and the viscosity, for example, according to DIN 53015.

Furthermore, the present invention relates to a composite material which is obtainable by
treating dried or moist cellulose- or lignocellulose-containing material with
a liquid which contains at least one aminosilane compound according to the formula (I) or at least one cocondensate based on at least one aminoalkylsilane of the general formula (I) and at least one further functional silane of the general formula (II),
bringing the cellulose or lignocellulose material thus treated into a desired form and then hot-pressing it.

The so-called "absolutely dry wood mass" is determined as a rule by treating cellulose- or lignocellulose-containing material at 103° C. to constant weight, in this context cf. DIN 53 183 and EN 322.

After the industrial process of defibrating in the so-called refiner, moist cellulose- or lignocellulose-containing material, for example in the form of wood fibers, can have a wood moisture content (also referred to below as moisture content for short) of more than 100%, based on absolutely dry wood mass. For example, freshly felled trunks have a moisture content of from 120 to 160° C., depending on the tree species.

In the production of MDF by the so-called "blow line" process, the fiber material used is as a rule not dried prior to gluing but passes from the upstream defibrillation process still in the moist state directly into the blow line, in which the binder is added to the fibers. The fibers are then dried in the glued state. A moisture content of about 10 to 14% is preferably established and subsequent further processing to MDF is effected.

However, it is also possible to use already dried cellulose- or lignocellulose-containing material for the production of composite materials.

Thus, for example in the production of MDF by the blender process, dried fibers are used, preferably those having a moisture content of about 10 to 12%. This material is as a rule glued in a mixer and then further processed to MDF. Here too the gluing step can be followed by an additional drying step, for example in a tubular dryer line.

The use of already dried chips, in particular those having a moisture content of from 2 to 5%, is furthermore preferred in the production of particleboard. The drying of this material used is predominantly effected in a tube-bundle dryer or rotary dryer.

The present invention also relates to a process for the production of a composite material according to the invention, by
- treating dried or moist cellulose- or lignocellulose-containing material with
  - a liquid which contains at least one aminosilane compound according to the formula (I) or at least one cocondensate based on at least one aminoalkylsilane of the general formula (I) and at least one further functional silane of the general formula (II),
- bringing the material thus treated into a desired form and then hot-pressing it.

For this purpose, the apparatuses or plants known per se for the production of composite materials, in particular wood-based materials, can be used, such as, for example, continuously operating Contiroll plants from Siempelkamp, Binos, Dieffenbacher or Metso—to mention but a few examples.

Suitable processes for the treatment of cellulose- or lignocellulose-containing material comprising a binder are, for example, brushing, roll-coating, spraying, dipping, flooding, spraying, blow line gluing or gluing in the mixer (blender process using apparatuses from, for example, Lödige, Drais or Binos).

Thus, the cellulose- or lignocellulose-containing material can be particularly advantageously sprayed in a rotating drum (circulation process, procedure preferably at room temperature or with cooling, for example at from 4 to 12° C., in particular at about 10° C.), by means of a gluing apparatus operated with compressed air, for example a gluing gun, which suitably has an operating pressure of from 0 to 4 bar abs., with an aqueous solution containing aminoalkylsilane compound according to the formulae (I) or (II) or (III). As a rule, a substantially uniformly glued material is thus obtained.

In addition, in the process according to the invention, the gluing can advantageously be carried out on the industrial scale, but also in a trough mixer, plowshare mixer, blender mixer and by the blow line process.

Furthermore, in the process according to the invention, the cellulose or lignocellulose material thus treated at ambient temperature can advantageously be scattered to give a cake, i.e. in particular a particle cake or mat, combed, and pressed at a temperature up to 250° C., preferably from 150 to 210° C., and a pressure up to 9 N/mm$^2$, preferably from 4 to 7 N/mm$^2$, and for a time of up to 300 s per mm of plate thickness required, preferably from 5 to 60 s/mm, particularly preferably from 8 to 40 s/mm.

However, other shaped articles, for example extrudates or cuboid parts or special shaped articles, can also be produced from a cake described above or from cellulose or lignocellulose material glued according to the invention.

Furthermore, however, an existing cake or glued material can also first be prepressed or precompacted, for example with a preliminary pressure of from 0.2 to 0.6 N/mm$^2$. Moreover, glued material, in particular a cake, can be preheated before, during or after the prepressing, i.e. before the actual pressing, for example to 60 to 80° C. Such a thermal and/or mechanical pretreatment of the cake or of the glued material before the actual pressing step can advantageously contribute to a substantial improvement of the subsequent product quality.

Moreover, the shaped articles obtained in the shaping or pressing step can advantageously be subjected to postconditioning or aging. Thus, for example, boards can be subjected to storage in a stack. Frequency heating, for example by means of microwave technology, can additionally be carried out.

However, cooling, for example for from 20 to 30 minutes in a star cooling turner, can also be effected.

As a result of the postconditioning, it was additionally possible to contribute to standardization or uniformity in the composite materials.

After the cooling, composite materials according to the invention are thus obtained, in particular particleboards, fiberboards, ultralight fiberboards (ULF), light fiberboards (LDF), medium density fiberboards (MDF), high density fiberboards (HDF), "OSB" boards (OSB=oriented strand board), veneer boards, plywood boards, wood pellets, wood briquettes and industrial construction material comprising wood, so-called "engineered wood", such as laminated strand lumber (LSL), parallel strand lumber (PSL) and laminated veneer lumber (LVL). Abovementioned composite materials suitably have a bulk density of from 150 to 1200 kg/m$^3$. The bulk density can be determined, for example, according to EN 323.

Nowadays, three raw material varieties are used in different proportions for obtaining the particles. About 57% of the required timber raw material is provided by industrial wood residue. Timber wastes from the wood treatment and processing industry are referred to as industrial wood residue. This includes sawdust, planing chips, cutting chips and shuttering boards, but also residual rolls from the veneer industry. About a further 23% of the wood raw material are obtained from forestry industry timber. This was the classical raw material in the form of harvested trunks which are processed in the particleboard works to give chips or directly by means of longwood chippers to give particles. The third group of raw materials comprises used or recycled wood at about 20%. These are used products comprising solid wood, wood-based materials or composites having a predominant wood content of more than 50% by mass. In the works, particles having defined dimensions are produced from the various raw material varieties by means of knife ring chippers, longwood chippers and hammer mills. After the particle material is available, it is dried in tube-bundle or rotary tube dryers, as a rule to a moisture content of from 1.5 to 3%. This is followed by screening and classification, the particle material being separated into top layer and middle layer particles and possible coarse particle material being separated off. The particles of the top and middle layer fraction can then be fed for gluing and, for example, molded to give particleboards.

In industrial fiber production, in general industrial wood residues are also used as raw material in addition to forestry timber. The previously debarked forestry timber is comminuted together with the industrial wood residue in a chipper to give chips. These chips are digested by the "Asplund process" in steam at 160 to 180° C. under a pressure of 8 to 12 bar. After this operation, the so-called plastification, the material enters a refiner. This consists of two counterrotating grinding disks between which the material is defibrated. A constant pressure of about 11 bar prevails in the refiner. Owing to the mild digestion conditions, the wood is subject to few chemical changes. This leads to a light color of the fiber thus provided and a high yield.

Lignocellulose is generally understood as meaning the matrix component which is formed by the three major chemical wood ingredients cellulose, hemicellulose and lignin. The incorporation of lignin (incrustation with lignin) leads as a rule to lignification of the cell wall and hence to improved mechanical stability and load capacity of terrestrial plants. Lignocellulose for use in the wood-based material industry is obtained predominantly in the form of fibers or particles. For example, lignocellulose fibers can be obtained from hardwoods and softwoods. Furthermore, some annual plants, such as cereal, flax or hemp, also constitute a suitable source of lignocellulose fibers.

The fibers can be obtained, inter alia, by the Asplund process. There, the wood is first comminuted to give chips and then digested at high temperatures and pressures and finally defibrated using a refiner (which consists of two counterrotating grinding disks).

For obtaining particles, as a rule wood in the form of chips is fed to so-called knife ring chippers and chipped therein to give particles having defined dimensions.

In the process according to the invention at least one natural or near-natural cellulose- or lignocellulose-containing material from the series consisting of industrial wood, forestry industry timber, used or recycled wood, wood shavings, wood chips, wood fibers, for example from pine wood, wood wool, wood dust, particles, such as sawdusts, planing chips or cutting chips, shuttering boards, veneer wastes, splinters, particle material from annual plants, e.g. hemp scrapings or wood straw, or a mixture of at least two or the abovementioned materials can advantageously be used according to component (a).

In the process according to the invention a cellulose- or lignocellulose-containing material from plants from the series consisting of hardwood, softwood, coconut, in particular coconut fibers, cotton, flax scrapings, hemp scrapings, bargasse, jute, sisal, reed, rice straw or cereal straw is particularly preferably used.

Furthermore, in the process according to the invention, an aminoalkylsilane compound of the formula (I) from the series consisting of 3-aminopropyltrimethoxy-silane, 3-aminopropyltriethoxysilane, 3-aminopropylmethyldimethoxysilane, 3-amino-propylmethyldiethoxysilane, 3-aminopropylsilanetriol, N-(2-aminoethyl)-3-aminopropyltrimethoxysilane, N-(2-aminoethyl)-3-aminopropyltriethoxysilane, N-(2-amino-ethyl)-3-aminopropylsilanetriol, N—[N'-(2-aminoethyl)-2-aminoethyl]-3-aminopropyl-trimethoxysilane, N—[N'-(2-aminoethyl)-2-aminoethyl]-3-aminopropyltriethoxysilane, N—[N'-(2-aminoethyl)-2-aminoethyl]-3-aminopropylsilanetriol, N,N-[di(2-aminoethyl)]-2-aminopropyltrimethoxysilane, N,N-[di(2-aminoethyl)]-2-aminopropyltriethoxysilane, N,N-[di(2-aminoethyl)]-2-aminopropylsilanetriol, N-(n-butyl)-3-aminopropyltrimethoxysilane, N-(n-butyl)-3-aminopropyltriethoxysilane, N-(n-butyl)-3-aminopropylsilanetriol, $(H_3CO)_3Si(CH_2)_3NH(CH_2)_3Si(OCH_3)_3$ (bis-AMMO), $(H_5C_2O)_3Si(CH_2)_3NH(CH_2)_3Si(OC_2H_5)_3$ (bis-AMEO), $(H_3CO)_3Si(CH_2)_3NH(CH_2)_2NH(CH_2)_2NH(CH_2)_3Si(OCH_3)_3$ (bis-DAMO), $(H_3CO)_3Si(CH_2)_3NH(CH_2)_2NH(CH_2)_2NH(CH_2)_2NH(CH_2)_2NH(CH_2)_3Si(OCH_3)_3$ (bis-TRIAMO) or a mixture of at least of the abovementioned aminoalkylsilanes or an aqueous solution of at least one of the abovementioned aminoalkylsilane compounds is preferably used according to component (b).

An aqueous solution containing aminoalkylsilane is as a rule prepared by a procedure in which water, preferably demineralized water, is mixed with the hydrolyzable aminoalkylsilane and, if appropriate, allowed to react with gentle heating and stirring. Suitably from 0.001 to 999 parts by weight of at least one aminoalkylsilane compound according to formula (I) are used per 1 part by weight of water. Preferably from 0.1 to 90 parts by weight of an aminoalkylsilane according to formula I, particularly preferably from 1 to 30 parts by weight, very particularly preferably from 5 to 15 parts by weight, in particular from 7 to 10 parts by weight, of an aminoalkylsilane according to formula I are used per 1 part by weight of water. In the reaction, oligomeric silanes may also form, at least proportionately. Furthermore, an organic or inorganic acid, for example formic acid, acetic acid, hydrochloric acid, nitric acid, sulfuric acid or phoshoric acid—to mention but a few—can be added to the mixture or the solution and the pH can preferably be adjusted to 2 to 10. In addition the alcohol hydrolysis product can be distilled off from the composition after the hydrolysis, if appropriate under reduced pressure. Aqueous, substantially alcohol-free solutions comprising virtually completely hydrolyzed aminoalkylsilane are obtained, the alcohol content being preferably less than 3% by weight, particularly preferably less than 1% by weight, very particularly preferably less than 0.5% by weight, in particular less than 0.1% by weight i.e. being below the limit of detection for such systems. Thus, a generally clear and alcohol-free, aqueous aminoalkylsilane-containing solution can advantageously be prepared, for example DYNASYLAN® 1151 or 1154 and can be used as a binder for composite materials, in particular for wood-based materials.

In the process according to the invention, cocondensates which are preferably based on at least one silane of the general formula (II) from the series consisting of tetraethoxysilane, methyltrimethoxysilane, methyltriethoxysilane, n-propyltrimethoxysilane, n-propyltriethoxysilane, n-butyl- and isobutyltrimethoxysilane, n-butyl- and isobutyltriethoxysilane, n-octyl- and isooctyltrimethoxysilane, n-octyl- and isooctyltriethoxysilane, phenyltrimethoxysilane, phenyltriethoxysilane, vinyltrimethoxysilane, vinyltriethoxysilane, tridecafluoro-1,1,2,2-tetrahydrooctyltrimethoxysilane, tridecafluoro-1,1,2,2-tetrahydrooctyltriethoxysilane, 3-glycidyloxypropyl-trimethoxysilane, 3-glycidyloxypropyltriethoxysilane, 3-methacryloxypropyl-trimethoxysilane, 3-methacryloxypropyltriethoxysilane, 3-mercaptopropyltrimethoxysilane, 3-mercaptopropyltriethoxysilane and those aminosilanes disclosed according to formula (I) are preferably used.

Binders used according to the invention and according to formula (III), i.e. cocondensates based on at least one aminoalkylsilane of the general formula (I) and at least one further functional silane of the general formula (II) or the aqueous solution thereof are obtainable as a rule by hydrolyzing corresponding monomeric alkoxy- or chlorosilanes by addition of an amount of water required for obtaining the desired degree of oligomerization and effecting condensation or cocondensation or block cocondensation, for example DYNASYLAN® 2907, 2909 or F 8815. The procedure can be effected in the presence of a hydrolysis or condensation catalyst. The hydrolysis and condensation or cocondensation or block cocondensation can also be carried out in the presence of a diluent or solvent, preferably methanol, ethanol and/or isopropanol. As a rule, alcohol or solvent is removed at least proportionately from the system after or during the reaction, and the system is diluted to the desired extent with water. In addition, further components, for example additional acid, alcohol, monomeric organosilanes or monomeric cationic aminosilanes, can be added to the composition present. The preparation of corresponding systems and starting materials suitable for this purpose are, however, also described in EP 0 716 127, EP 0 716 128, EP 0 846 717, EP 0 846 716, EP 1 031

593 and EP 1 101 787. The total content of the patents mentioned here is incorporated in its entirety in the disclosure of the present application.

Compounds according to formula (III) may be present in aqueous systems in proportion or in virtually completely hydrolyzed form. Furthermore, linear or cyclic silane oligomers according to formula (III) are preferably present, i.e. as a rule comparatively short-chain organosiloxanes which are substantially composed of M- and D-structures are present here. However, branched structures or three-dimensional structures, i.e. organosiloxanes according to formula (III) having T- or Q-structures, can also occur from time to time— but to a substantially minor extent. Binders used according to the invention preferably have a content of active substance according to formula (III), i.e. condensates based on at least one aminoalkylsilane of the general formula (I) and at least one further functional silane of the general formula (II) of from 0.5 to 95% by weight, particularly preferably from 2 to 40% by weight, very particularly preferably from 5 to 30% by weight, in particular from 5 to 20% by weight based on the composition.

According to the invention, a binder which contains from 0 to 3.6 mol of HCOOH or $H_3CCOOH$, preferably from 0.5 to 1.1 mol of acid per mole of nitrogen of the amino functions, is furthermore preferred.

Thus, compounds according to formula (III), i.e. cocondensates based on at least one aminoalkylsilane of the general formula (I) and at least one further functional silane of the general formula (II), and corresponding, as a rule clear and readily mobile solutions, for example DYNASYLAN® HS 2907, HS 2909 or F 8815 can advantageously be mixed with water in the desired ratio. The above-mentioned products or agents can also first be mixed and then optionally diluted with water and/or alcohol. For example, a triaminoalkyl/tridecafluoro-1,1,2,2-tetrahydrooctyl/hydroxy- or alkoxysiloxane mixture substantially neutralized with acetic acid or formic acid or a 3-aminopropyl/isobutyl/hydroxy- or alkoxysiloxane mixture substantially neutralized with acetic acid can be mixed with water in the volume ratio of from 1:0.5 to 0.5:5, preferably from about 1:1 to 0.5:2, and in particular about 1:2.

According to the invention, a binder having a water content of from 5 to 99.5% by weight, particularly preferably one having 50 to 98% by weight of water, very particularly preferably from 60 to 95% by weight of water, in particular from 80 to 95% by weight, based on the composition, is preferred, the respective components of the agent or of a composition summing to 100% by weight.

According to the invention, a binder may also have a content of free acid of <10% by weight, preferably from 0 to 7% by weight, particularly preferably from 0.001 to 5% by weight, based on the composition. In other words, acid fractions which are present as amino or ammonium salt are to be excluded here in the specification of the so-called free acid fractions.

Furthermore, such an agent may contain alcohol, in particular methanol, ethanol, n-propanol, isopropanol, 2-methoxyethanol or a mixture thereof. However, binders which are alcohol-free are preferred i.e. in such an agent free alcohol can be detected to a limit of not more than 3% by weight more by customary methods such as gas chromatography having a limit of detection of <0.1%.

As a rule, up to 15% by weight, preferably from 0.1 to 14% by weight, particularly preferably from 3 to 13% by weight, very particularly preferably from 5 to 12% by weight, of aminoalkylsilane compounds according to the formula (I) or at least one cocondensate based on at least one aminoalkylsilane of the general formula (I) and at least one further functional silane of the general formula (II), calculated as $SiO_2$ and based on absolutely dry cellulose or lignocellulose material, are preferably to be used in the process according to the invention as binding active substance according to component (b).

In addition, a wax or paraffin can be used in an amount of up to 8% by weight, preferably from 0.01 to 7% by weight, based on absolutely dry cellulose or lignocellulose material, as further component (c) in the present process, in addition to the components (a) and (b).

In general, the present invention is carried out as follows: Cellulose- or lignocellulose-containing material is treated with a binder which contains at least one aminoalkyl compound according to the formulae (I) or (III), for example in a pneumatically or hydraulically initiated gluing apparatus by spraying. Optionally, further components are added to the material thus obtained, and said material is introduced in the manner known per se into a mold and is cured. For example, the material thus obtained can be scattered on the surface of a hot press, combed and hot-pressed. During this procedure, the cellulose- or lignocellulose-containing material reacts with the binder present and water evaporates.

Composite materials according to the invention, in particular wood-based materials can thus advantageously be produced using at least one aminosilane compound according to the formula (I) or at least one cocondensate based on at least one aminoalkylsilane of the general formula (I) and at least one further functional silane of the general formula (II) or an aqueous solution which contains at least one aminosilane compound according to the formula (I) or at least one cocondensate based on at least one aminoalkylsilane of the general formula (I) and at least one further functional silane of the general formula (II).

In particular the present binders are used for the production of particleboards, fiberboards, ultralight fiberboards, light fiberboards, medium density fiberboards, high density fiberboards, OSB boards, veneer boards, plywood boards, wood pellets, wood briquettes, "engineered wood", insulating materials, plant pots, for example from red-rotting spruce wood, moldings, for example—but not exclusively—moldings for automotive interior trim.

The special aminoalkylsilane compounds according to the invention and their aqueous solutions are particularly suitable as binder for producing in particular wood-based materials having good mechanical-technological properties. The production and use of these wood-based materials are very substantially free of emissions which are harmful to health. The use of organofunctional silanes in combination with near-natural binders opens up the possibility of producing wood-based materials having mechanical-technological properties which meet the requirements of the relevant European standards (EN 622-5).

EXAMPLES

Example 1

Production of Medium Density Fiberboards (MDF) from Industrial Fiber Material

100% pine fibers were used as fiber material for production of MDF, in line with industrial standards. The fiberboards were produced in a pilot MDF plant in which the fibers can be automatically loosened, glued, dried and then scattered to give a mat. Fiberboards of defined sizes were obtained from the mat and, after precompaction, were pressed in an electrically heated single-daylight press at the desired temperature and for the desired time.

10 mm thick MDF having a required bulk density of 800 kg/m³ were produced. The boards were pressed at 195° C. for 24 s/mm. The binders used were DYNASYLAN® products DYNASYLAN® 1154, HS 2907 and HS 2909. The degree of gluing was 12% by weight of binder, based on absolutely dry fiber, in all cases.

The mechanical-technological properties of the fiberboard test are listed in Table 1.

layer. Single-layer particleboards produced consisted of 100% of middle layer material.

6 mm thick single-layer particleboards having a required bulk density of 750 kg/m³ were produced by middle layer particles using DYNASYLAN® HS 2907 and DYNASYLAN® 1154 as binders. The particle material was glued in each case with 8.5% of DYNASYLAN® HS 2907 and DYNASYLAN® 1154, based on absolutely dry particles. The particleboards were pressed at 210° C. and for a pressing time of 40 s/mm. The results of the material tests are summarized in Table 2.

TABLE 1

Mechanical-technological properties of DYNASYLAN ®-bound MDF in comparison

| Binder used | Transverse tensile strength according to EN 319 (N/mm²) | Change of transverse tensile strength compared with requirements (MDF) EN 622-5 (%) | Swelling after 24 hours according to EN 317 (%) | Change of thickness swelling compared with requirements EN 622-5 (MDF) (%) | Formaldehyde content according to EN 120 (mg/100 g) | Change of formaldehyde content compared with limit in DIBt guideline 100 (1994) (%) |
|---|---|---|---|---|---|---|
| DYNASYLAN ® 1154 | 1.29 | +115 | 7.48 | −50 | — | — |
| DYNASYLAN ® HS 2907 | 1.22 | +103 | 7.54 | −50 | — | — |
| DYNASYLAN ® HS 2909 | 1.48 | +147 | 6.99 | −53 | 0.2 | −3500 |
| UF reference[1)] | 0.92 | — | 24.05 | +60 | 6.6 | −6 |

[1)] = Degree of gluing 12% in all cases, without use of water repellents

The MDF bound with said DYNASYLAN® products are distinguished by very high strengths and particularly low swelling values. The transverse tensile strengths are all more than 100% above the specifications of the respective EN 622-5 (MDF). In addition, the specifications of EN 622-5 (MDF.HLS) with regard to swelling tensile strength and thickness swelling were also complied with. Thus, the MDF produced could also be used for load-bearing purposes in humid regions. The board properties determined surpass those of UF-resin bound MDF several fold and make it possible to use medium density fiberboards in applications having particularly high material requirements. In addition, there is a very low potential health hazard in the production and the subsequent use of these wood-based materials, which presents a problem, for example, in the case of PMDI-glued wood-based materials. The use of organic glue systems, e.g. aminoplasts, such as UF resin and PF resin, also entail a health risk which is not negligible. Such a problem can advantageously be overcome by the use of the present DYNASYLAN® systems.

Example 2

Production of Particleboards from Industrial Particle Material

The particles used for the production of the particleboard were taken from the belt weigher in an industrial particleboard works after drying and immediately before gluing. As a result of the process, they were divided into top and middle layer fractions. The respective binder was finely atomized by means of a gluing gun from WALTHER PILOT in a rotating gluing drum by means of compressed air (0 to 4 bar) and added to the particles.

The particles were then scattered to give particleboard cakes and were hot-pressed. In the case of three-layer particleboards, 40% of the top layer material were used for the outer layers and 60% of middle layer material for the inner

TABLE 2

Transverse tensile strengths of DYNASYLAN ®-bound single-layer particleboards

| Binder used | Transverse tensile strength (EN 319) (N/mm²) | Change of transverse tensile strength compared with EN 312-4 (0.45 N/mm²) (%) |
|---|---|---|
| DYNASYLAN ® 1154 | 0.51 | +13 |
| DYNASYLAN ® HS 2907 | 0.63 | +29 |

The particleboards of all test series were able to comply with EN 312-4 (0.45 N/mm²) and EN 312-5 (0.5 N/mm²). Thus, it was shown that organofunctional silanes were suitable as sole binders for particleboards.

The invention claimed is:

1. A composite material, comprising:
(a) at least one cellulose- or lignocellulose-containing material; and
(b) a binder, comprising:
(1) at least one aminoalkylsilane of formula (I):

$$R^1R^2N(CHR^4)_aSi(R^3)_r(OR)_{3-r} \quad (1),$$

wherein
groups $R^1$ and $R^2$ are identical or different, optionally substituted, and in each case are H or a linear, branched or cyclic $C_1$- to $C_{20}$-alkyl group or an aryl group or an aminocarbyl group;
groups $R^4$ are identical or different and $R^4$ is methyl;
a is from 1 to 10;
$R^3$ is H or a linear or branched $C_1$- to $C_8$-alkyl group;
groups R are identical or different and R is H or a linear or branched $C_1$- to $C_8$-alkyl group; and
r is 0 or 1 or 2;
or (2) at least one cocondensate of the at least one aminoalkylsilane of formula (I) and at least one functional silane of formula (II):

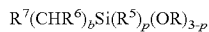 (II), wherein
$R^7$ is H or a vinyl group or an amino group or a glycidyloxy group or an acryloyloxy group or a methacryloyloxy group or a mercapto group or a sulfane group or a linear or branched $C_1$- to $C_{20}$-alkyl group or an aryl group, and wherein $R^7$ is optionally substituted;
groups $R^6$ are identical or different and $R^6$ is H or methyl;
b is from 0 to 18;
$R^5$ is H or a linear or branched $C_1$- to $C_8$-alkyl group;
groups R are identical or different and R is H or a linear or branched $C_1$- to $C_8$-alkyl group; and
p is 0 or 1 or 2;
wherein the amino functions in the cocondensate are optionally partly or completely neutralized with an inorganic or organic acid;
or
(3) an aqueous solution comprising the at least one aminoalkylsilane of formula (I) or at least one cocondensate of the at least one aminoalkylsilane of formula (I) and the at least one functional silane of formula (II).

2. The composite material according to claim 1, comprising:
(a) at least one natural or near-natural cellulose- or lignocellulose-containing material selected from the group consisting of industrial wood, forestry industry wood, used wood, recycled wood, wood shavings, wood chips, wood fibers, wood wool, wood dust, particles, shuttering boards, a veneer waste, splinters from at least one annual plant, and particle material from at least one annual plant.

3. The composite material according to claim 1, wherein the cellulose- or lignocellulose-containing fiber material originates from hardwood, softwood, a palm plant, or an annual plant.

4. The composite material according to claim 1, wherein component (b) is an aqueous, alcohol-free hydrolysis product of the at least one aminoalkylsilane compound of formula (I) or the at least one cocondensate.

5. The composite material according to claim 4, wherein the aqueous, alcohol-free hydrolysis product has
a pH of from 3 to 12, and
a viscosity of from 1 to 10 000 mPa·s,
at an active substance content of from 0.1 to 80% by weight, based on a total weight of the aqueous, alcohol-free hydrolysis product,
it being possible to adjust the active substance content by diluting a concentrate with water.

6. The composite material according to claim 1, further comprising:
(c) at least one further component selected from the group consisting of a water repellent comprising paraffin, a water repellent comprising wax, a flameproofing agent, a biocidal substance, and a fragrance.

7. The composite material according to claim 1, produced by a process comprising:
(i) treating dried or moist cellulose- or lignocellulose-containing material with a liquid comprising
the at least one aminosilane compound of formula (I), or the at least one cocondensate,
to give a treated cellulose- or lignocellulose-containing material;

(ii) bringing the treated cellulose- or lignocellulose-containing material into a desired form, to give a formed cellulose- or lignocellulose-containing material; and then
(iii) hot-pressing the formed cellulose- or lignocellulose-containing material.

8. A process for producing the composite material according to claim 1, wherein the process comprises:
(i) treating dried or moist cellulose- or lignocellulose-containing material with a liquid comprising
the at least one aminosilane compound of formula (I) or the at least one cocondensate,
to give a treated cellulose- or lignocellulose-containing material;
(ii) bringing the treated cellulose- or lignocellulose-containing material into a desired form, to give a formed cellulose- or lignocellulose-containing material; and then
(iii) hot-pressing the formed cellulose- or lignocellulose-containing material.

9. The process according to claim 8, wherein, in the treating (i), the cellulose- or lignocellulose-containing material is sprayed in a rotating drum by a gluing apparatus operated with compressed air with the aqueous solution.

10. The process according to claim 8, wherein up to 15% by weight of the at least one aminoalkylsilane compound of formula (I) or the cocondensate, calculated as $SiO_2$ and based on absolutely dry cellulose- or lignocellulose-containing material, are used as the binder (b).

11. The process according to claim 8, wherein a wax in an amount of up to 8% by weight, based on absolutely dry cellulose- or lignocellulose-containing material, is used as further component (c) in addition to the components (a) and (b).

12. The process according to claim 8, wherein
the treated cellulose- or lignocellulose-containing material at ambient temperature is scattered to form a cake and combed, to give the formed cellulose- or lignocellulose-containing material, and
the formed cellulose- or lignocellulose-containing material is pressed at a temperature up to 250° C. and a pressure up to 9 N/mm² and for a time up to 300 s/mm.

13. The process according to claim 8, wherein the cellulose- or lignocellulose-containing material is from at least one annual plant.

14. The process according to claim 8, wherein the cellulose- or lignocellulose-containing material is from at least one plant selected from the group consisting of hardwood, softwood, coconut, cotton, flax, hemp, bagasse, jute, sisal, reed, rice straw, and cereal straw.

15. The process according to claim 8, wherein the treated cellulose- or lignocellulose-containing material is thermally and/or mechanically pretreated before pressing.

16. The process according to claim 8, wherein a shaped article obtained from shaping or pressing are postconditioned.

17. A wood-based material, comprising the composite material according to claim 1.

18. The wood-based material according to claim 17, which is in a form selected from the group consisting of a particle board, a fiberboard, a ultralight fiberboard, a light fiberboard, a medium density fiberboard, a high density fiberboard, an OSB board, a veneer board, a plywood board, a molding, a molding for automotive interior trim, an industrial wood construction material, an insulating material, wood pellet, a wood briquette, and a plant pot.

19. The composite material according to claim 1, comprising (1) the at least one aminoalkylsilane of formula (I).

20. The composite material according to claim 1, comprising (2) the at least one cocondensate.

21. The composite material according to claim 1, comprising (3) the aqueous solution.

22. A composite material, comprising:
(a) at least one cellulose- or lignocellulose-containing material; and
(b) a binder, comprising:
(1) at least one aminoalkylsilane of formula (I):

wherein
groups $R^1$ and $R^2$ are identical or different, optionally substituted, and in each case are H or a linear, branched or cyclic $C_1$- to $C_{20}$-alkyl group or an aryl group or an aminocarbyl group;
groups $R^4$ are identical or different and $R^4$ is H or methyl, and $R^4$, in at least one case, is methyl;
a is from 1 to 10;
$R^3$ is H or a linear or branched $C_1$- to $C_8$-alkyl group;
groups R are identical or different and R is H or a linear or branched $C_1$- to $C_8$-alkyl group; and
r is 0 or 1 or 2;
or
(2) at least one cocondensate of the at least one aminoalkylsilane of formula (I) and at least one functional silane of formula (II):

wherein
$R^7$ is H or a vinyl group or an amino group or a glycidyloxy group or an acryloyloxy group or a methacryloyloxy group or a mercapto group or a sulfane group or a linear or branched $C_1$- to $C_{20}$-alkyl group or an aryl group, and wherein $R^7$ is optionally substituted;
groups $R^6$ are identical or different and $R^6$ is H or methyl;
b is from 0 to 18;
$R^5$ is H or a linear or branched $C_1$- to $C_8$-alkyl group;
groups R are identical or different and R is H or a linear or branched $C_1$- to $C_8$-alkyl group; and
p is 0 or 1 or 2;
wherein the amino functions in the cocondensate are optionally partly or completely neutralized with an inorganic or organic acid;
or
(3) an aqueous solution comprising the at least one aminoalkylsilane of formula (I) or the at least one cocondensate.

23. The composite material according to claim 22, comprising the aminoalkylsilane compound of formula (I) according to component (b) having at least one aminoalkyl group selected from the group consisting of 3-amino-2-methylpropyl, N-(2-aminoalkyl)-3-amino-2-methylpropyl, N-[N'-(2-aminoethyl)-2-aminoethyl]-3-amino-2-methylpropyl, N,N-[di(2-aminoethyl)]-3-amino-2-methylpropyl, and N-(n-butyl)-3-amino-2-methylpropyl.

* * * * *